US007689265B2

(12) United States Patent
Shen et al.

(10) Patent No.: US 7,689,265 B2
(45) Date of Patent: Mar. 30, 2010

(54) SYSTEM AND METHOD FOR THE JOINT EVALUATION OF MULTI PHASE MR MARROW IMAGES

(75) Inventors: Hong Shen, Plainsboro, NJ (US); Shuping Qing, Princeton, NJ (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 771 days.

(21) Appl. No.: 11/550,819

(22) Filed: Oct. 19, 2006

(65) Prior Publication Data
US 2007/0165923 A1    Jul. 19, 2007

Related U.S. Application Data

(60) Provisional application No. 60/728,222, filed on Oct. 19, 2005.

(51) Int. Cl.
*A61B 5/05* (2006.01)
*G06K 9/00* (2006.01)
*G06K 9/34* (2006.01)

(52) U.S. Cl. ............ 600/410; 600/411; 382/128; 382/168; 382/173

(58) Field of Classification Search ........... 600/410, 600/411; 382/128–134, 168–172, 173, 271–273
See application file for complete search history.

(56) References Cited

U.S. PATENT DOCUMENTS 5,410,250 A * 4/1995 Brown .................. 324/309
6,249,594 B1 * 6/2001 Hibbard ................. 382/128
6,535,615 B1 * 3/2003 Zachmann et al. ......... 382/100
7,454,045 B2 * 11/2008 Yao et al. ............... 382/128
2006/0052690 A1 * 3/2006 Sirohey et al. ........... 600/420

OTHER PUBLICATIONS

Mirowitz Sa et al., "MR Imaging of Bone Marrow Lesions: Relative Conspicousness on T1-weighted, Fat-Suppressed T2-Weighted, and STIR Images", American Journal of Roentgenology, 216, pp. 215-221, 1994.*
Disler DG et al., "In-phase and Out-of-Phase MR Imaging of Bone Marrow: Prediction of Neoplasia Based on the Detection of Coexistent Fat and Water", American Journal of Roentgeonology, 169(5), pp. 1439-1447, 1997.*

* cited by examiner

*Primary Examiner*—Eric F Winakur
*Assistant Examiner*—Katherine L Fernandez

(57) ABSTRACT

A method for jointly evaluating multi-phase magnetic resonance bone marrow images includes receiving a plurality of magnetic resonance (MR) image sequences of bones acquired using different protocols, each sequence comprising a plurality of images, each image comprising a plurality of intensities corresponding to a domain of points on a 2-dimensional grid, analyzing an image sequence to determine the MR protocol of said sequence, segmenting the bone marrow region in each image of said plurality of MR image sequences, and registering each MR image sequence to every other image sequence in said plurality of sequences wherein each point in each image of each of said plurality of image sequences is registered, wherein said registered image sequences are adapted to being analyzed synchronously.

24 Claims, 4 Drawing Sheets (a)

(b)

(c)

(d)

SYSTEM AND METHOD FOR THE JOINT EVALUATION OF MULTI PHASE MR MARROW IMAGES

CROSS REFERENCE TO RELATED UNITED STATES APPLICATIONS

This application claims priority from: "A system for the joint evaluation of multi-phase MR marrow images", U.S. Provisional Application No. 60/728,222 of Shen, et al., filed Oct. 19, 2005, the contents of which are incorporated herein by reference.

TECHNICAL FIELD

This invention is directed to visualization and analysis of bone marrow MR images.

DISCUSSION OF THE RELATED ART

Many diseases, such as leukemia, are associated with or manifest themselves in the bone marrow. Typical pathologies include bone tumors and abnormal patterns of "red" and "yellow" marrows. For example, the bone marrow of an adult is yellow in many parts of the bones, and there are multiple reasons when a significant amount of marrow turns yellow. It can be a sign of illness, such as leukemia, or simply because of lost of blood in an accident. It can also happen to the bone marrows of an obese person.

Magnetic Resonance Imaging (MRI) is widely applied as a medical imaging modality. The connection of MR with medical imaging comes because magnetism allows one to see the living organism. Most tissues in the human body are composed of water. The hydrogen atom in each of the molecules of water in the brain is a tiny magnetic dipole. When these tiny magnets in the brain tissue are placed inside of a very strong magnetic field, they align with the field just as a compass aligns with the earth's magnetic field. When a short pulse of radio-frequency energy perturbs these tiny magnets from their preferred alignment, they try to return to their original positions. In this realignment process, which is called relaxation, they give off small amounts of energy, which can be detected and amplified with an antenna placed around the head and body. This relaxation process, and therefore the amount of energy emitted, depends on the amount of water and biological parameters, are known as longitudinal relaxation time (T1) or transverse relaxation time (T2), depending on the tissue type and environment. Using various pulse sequences (the order, spacing, and type of radio frequency pulses that cause changes in the gradients of the magnetic field to produce magnetic resonance images) and imaging parameters, image intensity and contrast can be adjusted to reflect the difference among tissue types due to either T1 (T1-weighted image), T2 (T2-weighted image). T1-weighted images are typically acquired by using a short TR (less than 500 ms) and short TE (less than 30 ms), where TR is the pulse sequence repetition time and TE is echo time. On the contrary, T2-weighted images are acquired using a TR longer than tissue T1 and a TE between the longest and shortest tissue T2s of interest. Since various tissue types at various locations have varying T1 and T2, T1 or T2 weighted images for some tissue types are not necessarily T1 or T2 weighted for others.

The conventional evaluation of marrow uses two magnetic resonance (MR) protocols, specifically $T_1$-weighted (T1) and $T_2$-weighted short-time inversion recovery ($T_2$-STIR), and therefore creates two data sequences. Yellow marrow appears high intensity in $T_1$, and low intensity in STIR, which is contrary to red marrow. To further discriminate the pathologies, parameters are changed in $T_1$ protocol to create the In and Out phase images. Changes of intensity in the later two sequences are most interesting. For example, fat will remain constant or rise in intensity. Physician will jointly evaluate all four sequences to determine the possible diseases. FIG. 1 depicts examples of the four sequences for the femur: FIG. 1(a) in the top left depicts a $T_1$ slice; FIG. 1(b) in the top right depicts a STIR slice; FIG. 1(c) in the bottom left depicts an In-phase slice; and FIG. 1(d) in the bottom right depicts an Out-phase slice.

The thorough evaluation of marrow requires whole-body imaging to observe marrow in all parts of the bone structure. New generations of scanners allow whole body imaging without coil changes, providing a more global assessment in the time previously needed to scan a single area. The amount of data, on the other hand, is significantly increased.

An automatic system would be helpful in assisting the combined reading process of the four sequences and would improve throughput, by providing automated functionalities such as point correspondence, marrow area segmentation, pathology classification, and effective information presentation to the physician.

SUMMARY OF THE INVENTION

Exemplary embodiments of the invention as described herein generally include methods and systems for the evaluation of multi-phase MR marrow images. The images from each of the phases are registered, segmented, and jointly evaluated to provide enhanced viewing of marrow properties.

According to an aspect of the invention, there is provided a method for jointly evaluating multi-phase magnetic resonance bone marrow images including receiving a plurality of magnetic resonance (MR) image sequences of bones acquired using different protocols, each sequence comprising a plurality of images, each image comprising a plurality of intensities corresponding to a domain of points on a 2-dimensional grid, analyzing an image sequence to determine the MR protocol of said sequence, segmenting the bone marrow region in each image of said plurality of MR image sequences, and registering each MR image sequence to every other image sequence in said plurality of sequences wherein each point in each image of each of said plurality of image sequences is registered, wherein said registered image sequences are adapted to being analyzed synchronously.

According to a further aspect of the invention, the protocols include $T_1$ images, STIR images, and In-Out phase images.

According to a further aspect of the invention, the method includes separating said In-Out phase sequence into an In-phase sequence and an Out-phase sequence.

According to a further aspect of the invention, the method includes automatically clipping intensity values of each said image by analyzing a histogram of intensity values of each image, to calculate a mean intensity value, wherein a sub-range center value and width can be determined, wherein a clipped intensity value is adapted for display on said display device.

According to a further aspect of the invention, segmenting said bone marrow region comprises detecting bone features in an image, initializing a model contour, and iteratively deforming said contour to a desired boundary.

According to a further aspect of the invention, registering each MR image sequence comprises providing a registration transformation between points in corresponding images of said sequences of images, and registering the images of each sequence of images.

According to a further aspect of the invention, the method includes displaying an image of each sequence of images in a window of a display screen, wherein a selection of one image in one of said displayed sequences of images results in a corresponding registered image in each of the other displayed sequences of images to be displayed.

According to a further aspect of the invention, the method includes jointly scrolling through said plurality of image sequences wherein scrolling through one of said plurality of image sequences results in each of the other image sequences being scrolled synchronously by application of said registration transformations.

According to a further aspect of the invention, the method includes displaying images of each sequence of images using a color map that maps a pre-defined image intensity range to pre-determined color.

According to a further aspect of the invention, the method includes jointly classifying points in an image of one of said sequences of images according to rules formulated according to medical implications of intensity ranges in said image and intensity ranges in corresponding registered images of the other sequences of images.

According to a further aspect of the invention, the method includes providing said plurality of images to train a rule-based classifier adapted to classifying points in an image, wherein said images in said plurality of MR images sequences have been annotated.

According to a further aspect of the invention, the method includes constructing a map to store a classification category of each point as determined by said rule-based classifier.

According to another aspect of the invention, there is provided a program storage device readable by a computer, tangibly embodying a program of instructions executable by the computer to perform the method steps for jointly evaluating multi-phase magnetic resonance bone marrow images.

DETAILED DESCRIPTION OF THE PREFERRED EMBODIMENTS

Figure 1:
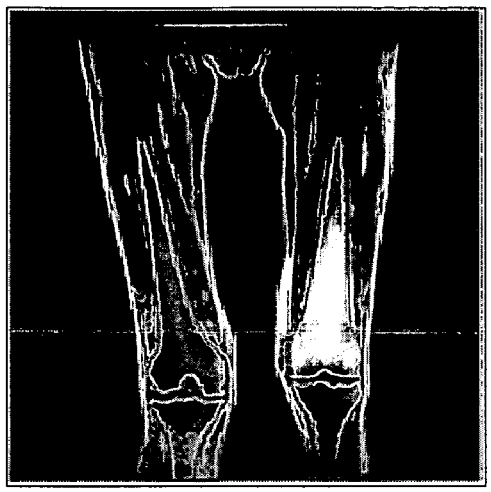
FIGS. 1(a)-(d) illustrate four phases of MR femur images for bone marrow evaluation, according to an embodiment of the invention.
Figure 1:
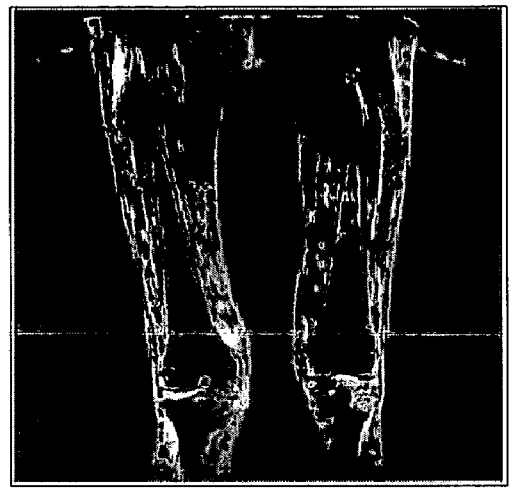
Figure 1:
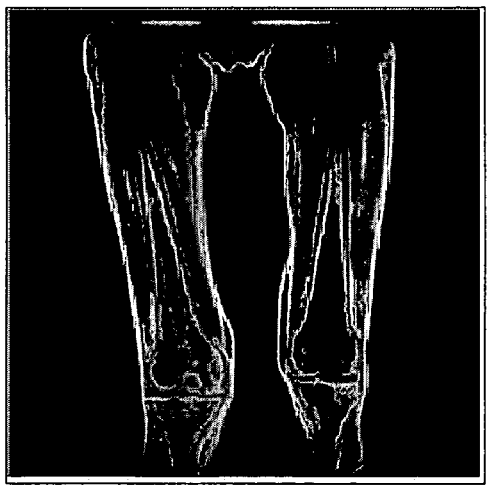
Figure 1:

Exemplary embodiments of the invention as described herein generally include systems and methods for the evaluation of multi-phase MR marrow images. Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention.

As used herein, the term "image" refers to multi-dimensional data composed of discrete image elements (e.g., pixels for 2-D images and voxels for 3-D images). The image may be, for example, a medical image of a subject collected by computer tomography, magnetic resonance imaging, ultrasound, or any other medical imaging system known to one of skill in the art. The image may also be provided from non-medical contexts, such as, for example, remote sensing systems, electron microscopy, etc. Although an image can be thought of as a function from $R^3$ to R, the methods of the inventions are not limited to such images, and can be applied to images of any dimension. e.g. a 2-D picture or a 3-D volume. For a 2- or 3-dimensional image, the domain of the image is typically a 2- or 3-dimensional rectangular array, wherein each pixel or voxel can be addressed with reference to a set of 2 or 3 mutually orthogonal axes. The terms "digital" and "digitized" as used herein will refer to images or volumes, as appropriate, in a digital or digitized format acquired via a digital acquisition system or via conversion from an analog image.

Figure 2:
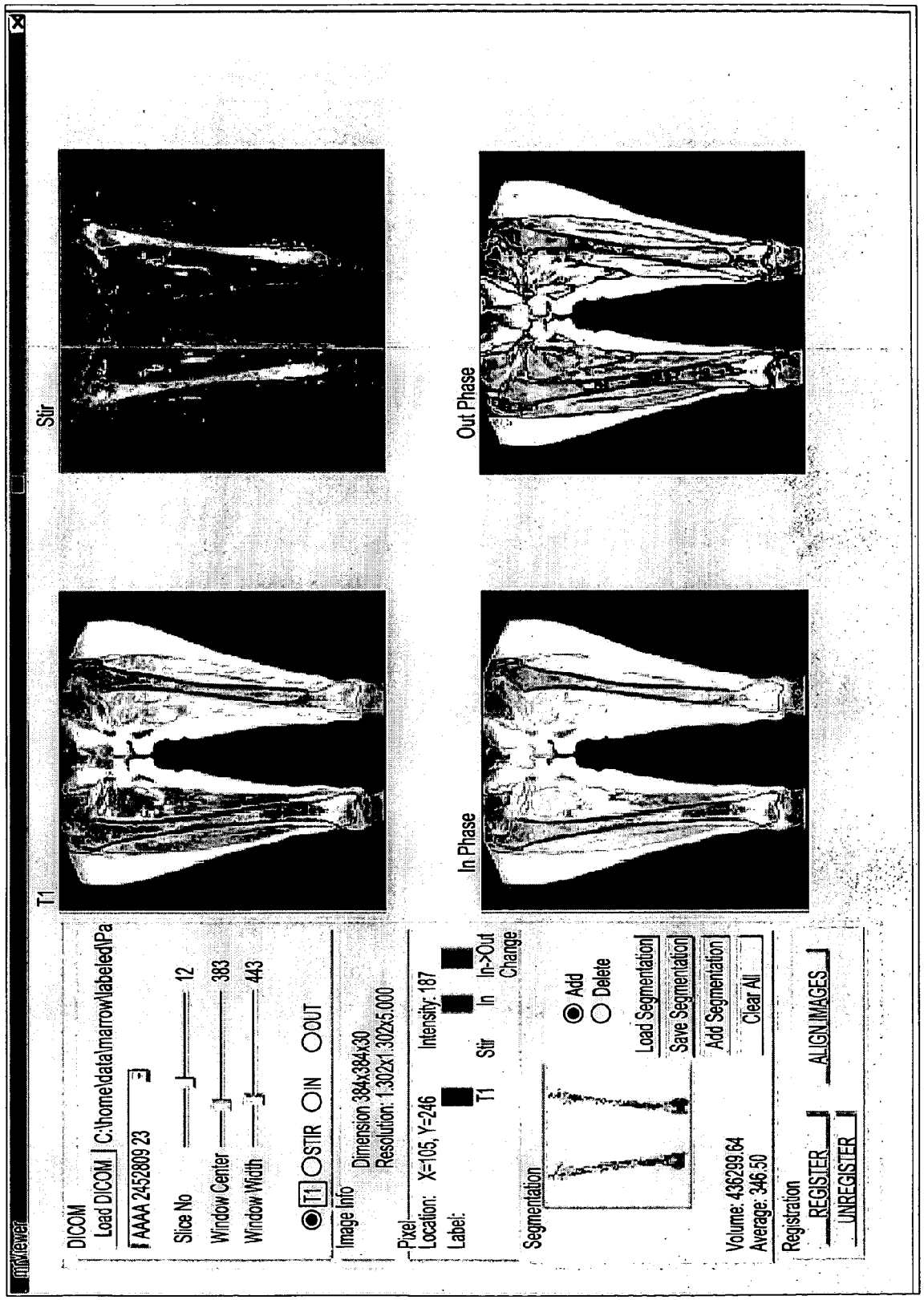
FIG. 2 depicts an exemplary interface of a prototype system according to an embodiment of the invention.

FIG. 2 illustrates the system interface of the system according to an embodiment of the invention for the evaluation of multi-phase marrow sequences. In the interface, femur images are used as examples for demonstration, but images of all other bone types can be evaluated using a system according to an embodiment of the inventions. Although four images are displayed in the interface depicted in FIG. 2, this number is exemplary an non-limiting, and a system interface according to an embodiment of the invention can display any number of images.

Figure 3:
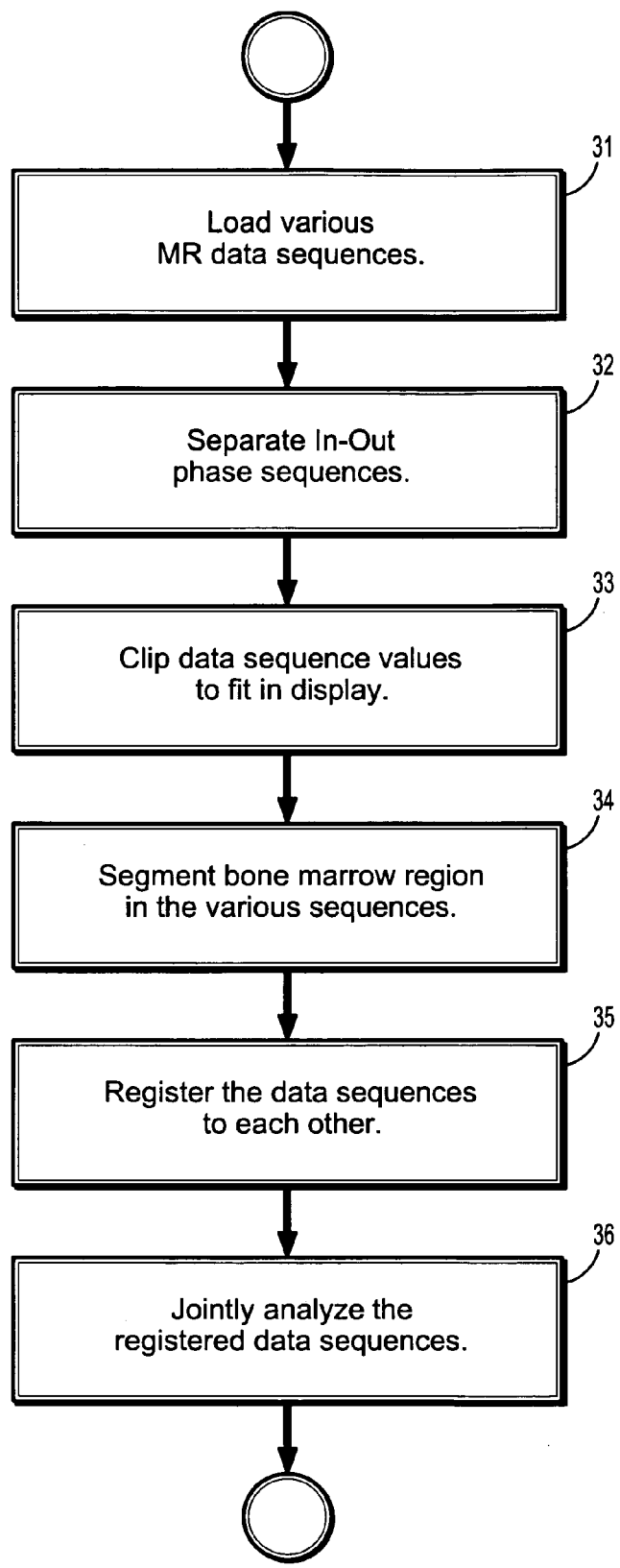
FIG. 3 is a flowchart of a method for evaluation of multi-phase MR marrow images, according to an embodiment of the invention.

A flowchart of a method for evaluation of multi-phase MR marrow images, according to an embodiment of the invention is shown in FIG. 3. Referring now to the figure, the method starts at step 31 by loading three data sequences of bone data acquired from differing protocols. Exemplary protocols include $T_1$, STIR, and In-Out data. The in-out sequence is separated into in and out sequences at step 32. At step 33, data values in the sequences are clipped from 12 bits to 8 bits for the purposes of being displayed. The bone marrow regions represented by each of the data sequences are segmented at step 34, and the segmented bone marrows are used at step 35 to register the data sequences to each other. Details of each of these steps are provided herein below. The registered data sequences can now be analyzed synchronously at step 36.

A system according to an embodiment of the invention can load three data sequences from different protocols: $T_1$, STIR, and In-Out. These MR image protocols are exemplary and non-limiting, and other MR imaging protocols are encompassed according to other embodiments of the invention. The in phase and out phase data are originally contained in one sequence, and will be separated later, as described herein below. An exemplary, non-limiting data format is the general DICOM format, however, this is not a requirement. An exemplary interface of a prototype system according to an embodiment of the invention is shown in FIG. 2. In the embodiment shown in FIG. 2, there is only one load button, and the user would select the button to inform the system which data sequence is to be loaded. According to other embodiments of the invention, there is a loading button dedicated to each data sequence that can be loaded.

According to another embodiment of the invention, the system can automatically determine the type of data sequence being loaded by analyzing the image properties of that sequence. From the difference in the intensity profiles of these data, one can extract parameters to distinguish one type of data sequence from the other. For example, the $T_1$ sequence overall is much brighter than the STIR sequence, and In-Out sequence contains two series of images of the same anatomy. One can therefore compute histogram based features to categorize the sequences. For instance, $T_1$ images should have a peak of population located at a higher intensity level than $T_2$ images. In this exemplary embodiment, only one load button is needed and the type of data need not be specified.

The In-Out data sequence is initially connected in the axial direction. As described above, the In-Out data is separates into In and Out sequences by finding the transit axial slices and divide the data at these slices. These transit axial slices can be identified by the presence of completely dark slices between the two data series.

The loaded and separated four data sets are displayed in dedicated windows, as shown in FIG. 2. One function of a system according to an embodiment of the invention is clipping intensity values of the data for the display. This is performed because most monitor displays have an 8-bit resolution, while MR data is typically 12-bit. The clipping function maps a selected sub-range of the 12-bit intensity to the 8-bit display. According to an embodiment of the invention, the user selects the center and width of the intensity sub-range by adjusting corresponding sliders. In one embodiment, the user selects a window to adjust. In an alternative embodiment, there exits a set of four such buttons, one dedicated to each of the data sequences. According to another embodiment of the invention, the user selects either the minimum or maximum value of the intensity sub-range by a similar mechanism, and the system of the embodiment of the invention selects the corresponding maximum or minimum. However, in other embodiments of the invention wherein the display device supports display of data of the same word size and resolution as the acquired imaging data, clipping of the data will not be required.

A system according to other embodiments of the invention automatically determines the best windowing. For example, the intensity histogram can be analyzed to determine a mean intensity value and its standard deviation, from which a sub-range center value and width can be determined. Afterwards, the histogram intensity statistics can be associated with typical settings. This can further be enhanced by learning and storing the settings of individual physicians, thus making the settings more subjective. According to other embodiments of the invention, the user can override the automatically determined settings using manual techniques as described above.

The marrow regions in each data sequence should be segmented, as this is the basis of all quantitative analysis. After segmentation, other analysis functions will be applied only to marrow regions. Different algorithms will be used to segment different bone types according to the bone type properties. Generally, bone features will be detected from the image, and an initial segmentation model contour will be estimated. A deformable model such as the Level Set method or an Active Shape Model is applied to iteratively evolve a contour to the desired boundaries. Depending on the data sequence, a region or edge based method can be applied. Prior knowledge of the bones, such as intensity and shape, can be incorporated into segmentations for a specific piece of bones. FIG. 2 shows in outline resultant segmentation boundaries.

Segmentation can also enable user interaction to help achieve satisfactory results at difficult places. The interaction can be hierarchical, from simple to complex.

After segmentation the data sequences are registered to establish point correspondences so that joint evaluation of the four data sequences can be performed. Registration transformations between each pair of data sequences can be estimated wherein every voxel in the four sequences is registered. According to some embodiments of the invention, the in-slice registration is not necessary since the in-slice voxel correspondence is already provided, in which case 1D registration is needed in the axial direction. A system according to an embodiment of the invention can use feature-based or correlation-based registration techniques. Feature-based registration techniques include high-level linear features, corners, and curved shapes. According to, other embodiments of the invention, where the in-slice correspondence is not established, the registration transformation can be estimated using similar techniques.

After registration, given any point in any sequence, the correspondences in all other sequences can be instantly computed. As an immediate benefit, when user moves the mouse in one window, the intensity values of all data sequences of that location will be updated in real-time. Further, the intensity values of a voxel and its correspondences can now be jointly analyzed.

The user can scroll through all slices by adjusting a slice control. When all data sequences are registered, the slices in all windows can be synchronized. That is, scrolling through the slices of one sequence will automatically update the other windows to display the corresponding slices in the other data sequences.

According to other embodiments of the invention, intensity information of the various data sequences can be presented using a color scheme that is familiar to physicians. According the intensity range definitions for each sequence, the color will vary from blue to green to red, providing an intuitive indication of whether the intensity is in a normal range. For each sequence, a color map can show the color of each voxel in the marrow region.

To jointly estimate types pathologies, physicians have defined various sets of rules. Examples of these rules include the meaning of intensity values in $T_1$ and STIR, and the meaning of an intensity change from In- to Out-phase. A rule based classifier according to an embodiment of the invention assigns voxels into a set of predefined categories based on an analysis according to the rules. These rules will be specifically designed according to the medical implications of the intensities of the images. By registering each point in each image and by registering all images, the intensity ranges in an image of a sequence of one protocol can be correlated with intensity ranges in corresponding images in the other protocol, using the registration transformations. For example, a rapid decrease of intensity from In to Out images and a high intensity in a STIR image may imply normal tissue. Certainly, since a general procedure of marrow imaging and the implications of the intensity combinations are not clearly defined, much data is needed to define these rules.

According to another embodiment of the invention, a learning based classifier can be trained when sufficient data samples have been collected and marked by physicians. This saves physicians from the time to develop the rules and provides more objective results.

From the result of voxel classification, a map can be constructed to store the category of each voxel. A suggested diagnosis can be reached when region analysis and decision rules are applied to this map.

It is to be understood that the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

Figure 4:
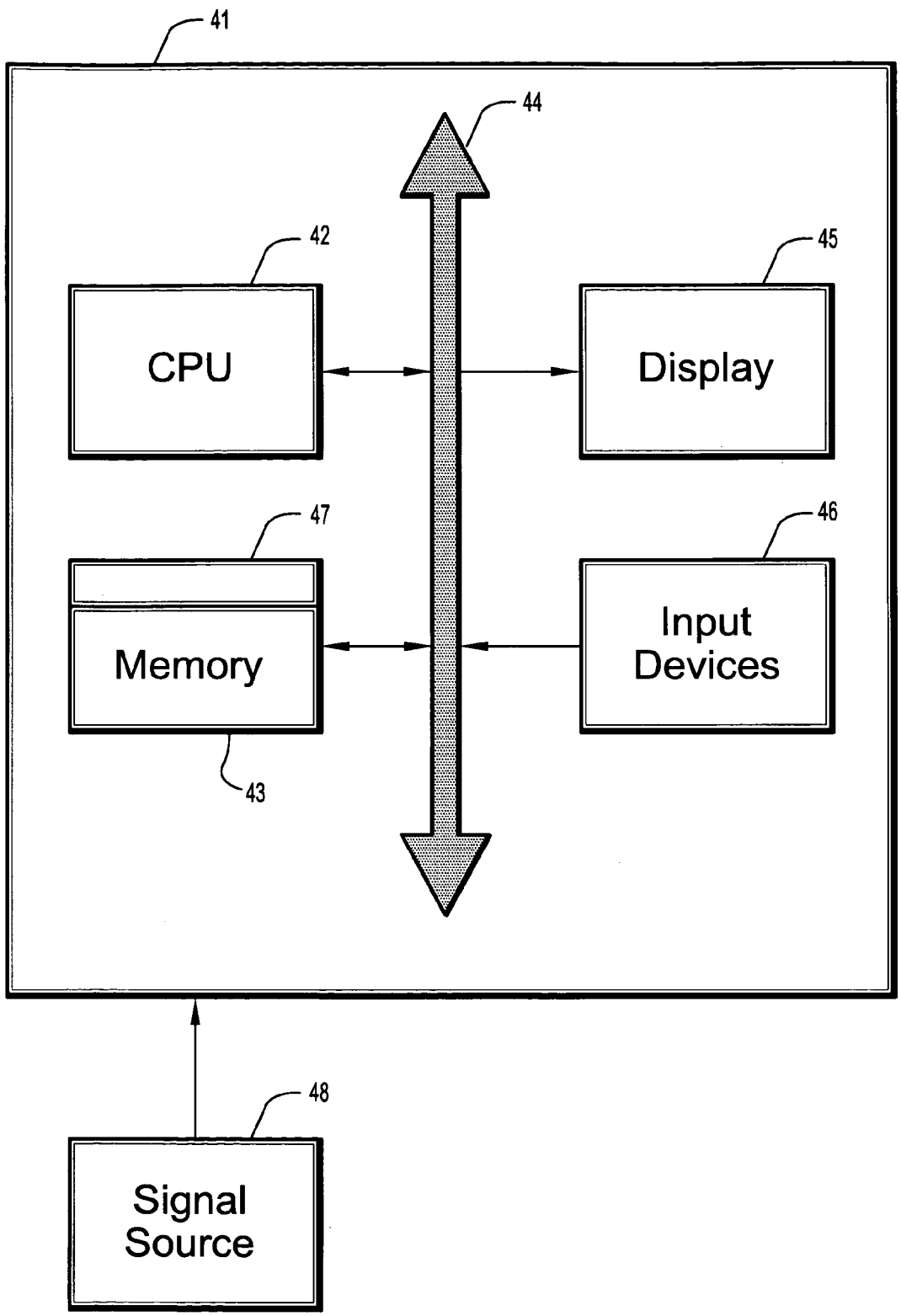
FIG. 4 is a block diagram of an exemplary computer system for implementing a method for evaluation of multi-phase MR marrow images, according to an embodiment of the invention.

FIG. 4 is a block diagram of an exemplary computer system for implementing a method for evaluation of multi-phase MR marrow images according to an embodiment of the invention.

Referring now to FIG. 4, a computer system 41 for implementing the present invention can comprise, inter alia, a central processing unit (CPU) 42, a memory 43 and an input/output (I/O) interface 44. The computer system 41 is generally coupled through the I/O interface 44 to a display 45 and various input devices 46 such as a mouse and a keyboard. The support circuits can include circuits such as cache, power supplies, clock circuits, and a communication bus. The memory 43 can include random access memory (RAM), read only memory (ROM), disk drive, tape drive, etc., or a combinations thereof. The present invention can be implemented as a routine 47 that is stored in memory 43 and executed by the CPU 42 to process the signal from the signal source 48. As such, the computer system 41 is a general purpose computer system that becomes a specific purpose computer system when executing the routine 47 of the present invention.

The computer system 41 also includes an operating system and micro instruction code. The various processes and functions described herein can either be part of the micro instruction code or part of the application program (or combination thereof) which is executed via the operating system. In addition, various other peripheral devices can be connected to the computer platform such as an additional data storage device and a printing device.

It is to be further understood that, because some of the constituent system components and method steps depicted in the accompanying figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

While the present invention has been described in detail with reference to a preferred embodiment, those skilled in the art will appreciate that various modifications and substitutions can be made thereto without departing from the spirit and scope of the invention as set forth in the appended claims.

What is claimed is:

1. A computer implemented method for jointly evaluating multi-phase magnetic resonance bone marrow images comprising the steps of:
   receiving a plurality of magnetic resonance (MR) image sequences of bones acquired using different protocols, each sequence comprising a plurality of images, each image comprising a plurality of intensities corresponding to a domain of points on a 2-dimensional grid;
   analyzing an image sequence by computing intensity histograms and extracting parameters to determine the MR protocol of said sequence;
   segmenting the bone marrow region in each image of said plurality of MR image sequences; and
   registering each MR image sequence to every other image sequence in said plurality of sequences wherein each point in each image of each of said plurality of image sequences is registered, wherein said registered image sequences are adapted to being analyzed synchronously, wherein said steps of receiving a plurality of MR image sequences, determining the MR protocol of each said sequence, segmenting the bone marrow region in each image, and registering each MR image sequence are performed by a computer processor.

2. The method of claim 1, wherein said protocols include $T_1$ images, STIR images, and In-Out phase images.

3. The method of claim 2, further comprising separating said In-Out phase sequence into an In-phase sequence and an Out-phase sequence.

4. The method of claim 1, further comprising automatically clipping intensity values of each said image by analyzing a histogram of intensity values of each image, to calculate a mean intensity value, wherein a sub-range center value and width can be determined, wherein a clipped intensity value is adapted for display on said display device.

5. The method of claim 1, wherein segmenting said bone marrow region comprises detecting bone features in an image, initializing a model contour, and iteratively deforming said contour to a desired boundary.

6. The method of claim 1, wherein registering each MR image sequence comprises providing a registration transformation between points in corresponding images of said sequences of images, and registering the images of each sequence of images.

7. The method of claim 1, further comprising displaying an image of each sequence of images in a window of a display screen, wherein a selection of one image in one of said displayed sequences of images results in a corresponding registered image in each of the other displayed sequences of images to be displayed.

8. The method of claim 7, further comprising jointly scrolling through said plurality of image sequences wherein scrolling through one of said plurality of image sequences results in each of the other image sequences being scrolled synchronously by application of said registration transformations.

9. The method of claim 7, further comprising displaying images of each sequence of images using a color map that maps a pre-defined image intensity range to pre-determined color.

10. The method of claim 1, further comprising jointly classifying points in an image of one of said sequences of images according to rules formulated according to medical implications of intensity ranges in said image and intensity ranges in corresponding registered images of the other sequences of images.

11. The method of claim 10, further comprising providing said plurality of images to train a rule-based classifier adapted to classifying points in an image, wherein said images in said plurality of MR images sequences have been annotated.

12. The method of claim 11, further comprising constructing a map to store a classification category of each point as determined by said rule-based classifier.

13. A program storage device readable by a computer, tangibly embodying a program of instructions executable by the computer to perform the method steps for jointly evaluating multi-phase magnetic resonance bone marrow images, said method comprising the steps of:
   receiving a plurality of magnetic resonance (MR) image sequences of bones acquired using different protocols, each sequence comprising a plurality of images, each image comprising a plurality of intensities corresponding to a domain of points on a 2-dimensional grid;
   analyzing an image sequence by computing intensity histograms and extracting parameters to determine the MR protocol of said sequence;
   segmenting the bone marrow region in each image of said plurality of MR image sequences; and
   registering each MR image sequence to every other image sequence in said plurality of sequences wherein each point in each image of each of said plurality of image sequences is registered, wherein said registered image sequences are adapted to being analyzed synchronously.

14. The computer readable program storage device of claim 13, wherein said protocols include $T_1$ images, STIR images, and In-Out phase images.

15. The computer readable program storage device of claim 14, the method further comprising separating said In-Out phase sequence into an In-phase sequence and an Out-phase sequence.

16. The computer readable program storage device of claim 13, the method further comprising automatically clipping intensity values of each said image by analyzing a histogram of intensity values of each image, to calculate a mean intensity value, wherein a sub-range center value and width can be determined, wherein a clipped intensity value is adapted for display on said display device.

17. The computer readable program storage device of claim 13, wherein segmenting said bone marrow region comprises detecting bone features in an image, initializing a model contour, and iteratively deforming said contour to a desired boundary.

18. The computer readable program storage device of claim 13, wherein registering each MR image sequence comprises providing a registration transformation between points in corresponding images of said sequences of images, and registering the images of each sequence of images.

19. The computer readable program storage device of claim 13, the method further comprising displaying an image of each sequence of images in a window of a display screen, wherein a selection of one image in one of said displayed sequences of images results in a corresponding registered image in each of the other displayed sequences of images to be displayed.

20. The computer readable program storage device of claim 19, the method further comprising jointly scrolling through said plurality of image sequences wherein scrolling through one of said plurality of image sequences results in each of the other image sequences being scrolled synchronously by application of said registration transformations.

21. The computer readable program storage device of claim 19, the method further comprising displaying images of each sequence of images using a color map that maps a pre-defined image intensity range to pre-determined color.

22. The computer readable program storage device of claim 13, the method further comprising jointly classifying points in an image of one of said sequences of images according to rules formulated according to medical implications of intensity ranges in said image and intensity ranges in corresponding registered images of the other sequences of images.

23. The computer readable program storage device of claim 22, further comprising providing said plurality of images to train a rule-based classifier adapted to classifying points in an image, wherein said images in said plurality of MR images sequences have been annotated.

24. The computer readable program storage device of claim 23, the method further comprising constructing a map to store a classification category of each point as determined by said rule-based classifier.

* * * * *